(12) United States Patent
Schnell et al.

(10) Patent No.: US 7,077,148 B2
(45) Date of Patent: Jul. 18, 2006

(54) REDUNDANT VALVE SYSTEM

(75) Inventors: Richard E. Schnell, Oswego, IL (US); Eric Oden Cummings, Lexington, SC (US); Mark Entwistle, Burnley (GB)

(73) Assignee: Ross Operating Valve Company, Troy, MI (US)

( * ) Notice: Subject to any disclaimer, the term of this patent is extended or adjusted under 35 U.S.C. 154(b) by 229 days.

(21) Appl. No.: 10/756,017

(22) Filed: Jan. 13, 2004

(65) Prior Publication Data

US 2004/0250861 A1    Dec. 16, 2004

Related U.S. Application Data

(60) Provisional application No. 60/477,887, filed on Jun. 12, 2003.

(51) Int. Cl.
*F16K 37/00* (2006.01)
*F16K 31/02* (2006.01)
*F16K 11/24* (2006.01)

(52) U.S. Cl. .................. 137/1; 137/551; 137/559.07; 137/624.12

(58) Field of Classification Search ........... 137/599.07, 137/601.14, 554, 551, 624.12, 596.12, 110, 137/106, 1
See application file for complete search history.

(56) References Cited

U.S. PATENT DOCUMENTS

| 3,951,162 | A | * | 4/1976 | Wilke | 137/106 |
| 4,184,410 | A | * | 1/1980 | Johnson | 91/421 |
| 4,967,792 | A | * | 11/1990 | Magee | 137/552 |

* cited by examiner

*Primary Examiner*—Stephen M. Hepperle
(74) *Attorney, Agent, or Firm*—MacMillan, Sobonsky & Todd

(57) ABSTRACT

The redundant valve system 10 of the preferred embodiments includes a first valve unit 12, a second valve unit 14, a third valve unit 16, a first diagnostic device 18, a second diagnostic device 20, and a control unit 22. The third valve unit has a first position that allows fluid flow toward the first valve unit and a second position that allows fluid flow toward the second valve unit. The first diagnostic device and the second diagnostic device are adapted to detect the presence of a fault in the first valve unit and the second valve unit, respectively. The control unit is coupled to the third valve unit and adapted to cycle between a first operation mode that requests the first position for the third valve unit and a second operation mode that requests the second position for the third valve unit.

18 Claims, 1 Drawing Sheet

REDUNDANT VALVE SYSTEM

CROSS-REFERENCE TO RELATED APPLICATIONS

The present invention claims priority to U.S. Provisional Application No. 60/477,887 entitled "ALWAYS READY VALVE" and filed 12 Jun. 2003.

TECHNICAL FIELD

This invention relates generally to the field of fluid control systems, and more specifically to an improved redundant valve system in the field of fluid control systems.

BACKGROUND

Valves are used in many industrial applications for opening and closing presses, dispensing materials, and other similar functions. Redundant valve systems are often used in such applications where an undesired or unsafe condition could be created if there is a fault in a valve and it does not function correctly. A typical redundant valve system includes a primary valve and a secondary (or "redundant") valve, which is arranged in a parallel configuration with the primary valve. If a fault occurs in the primary valve, the secondary valve is used to perform the function of the primary valve. The secondary valve is typically a static standby valve, which is used only during a fault in the primary valve. Static standby valves are subject to valve sticking, which make them unreliable. Since secondary valves are only used to correct an undesired or unsafe condition, the reliability of a secondary valve is less than ideal. Thus, there is a need in the field of fluid control systems to create an improved redundant valve system. This invention provides such system.

DESCRIPTION OF THE PREFERRED EMBODIMENTS

The following description of preferred embodiments of the invention is not intended to limit the invention to these preferred embodiments, but rather to enable any person skilled in the art of fluid control systems to make and use this invention.

Figure 1:
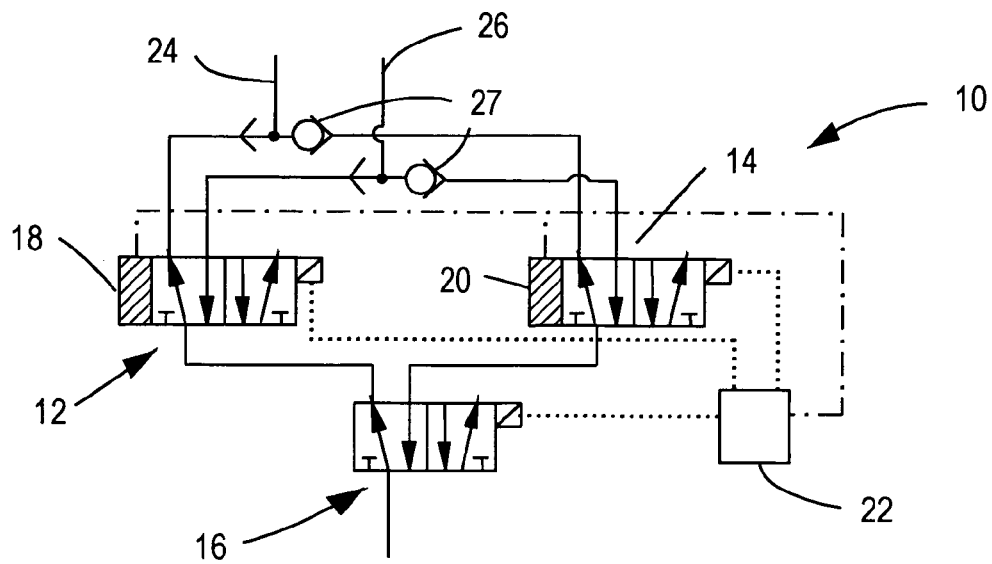
FIG. 1 is a schematic diagram of a first preferred embodiment of the invention.

As shown in FIG. 1, the redundant valve system 10 of the first preferred embodiment includes a first valve unit 12, a second valve unit 14, a third valve unit 16, a first diagnostic device 18, a second diagnostic device 20, and a control unit 22. The third valve unit 16 has a first position that allows fluid flow toward the first valve unit 12 and a second position that allows fluid flow toward the second valve unit 14. The first diagnostic device 18 and the second diagnostic device 20 are adapted to detect the presence of a fault in the first valve unit 12 and the second valve unit 14, respectively. The control unit 22 is coupled to the third valve unit 16 and adapted to cycle between a first operation mode that requests the first position for the third valve unit 16 and a second operation mode that requests the second position for the third valve unit 16. The redundant valve system 10 of the preferred embodiments is suitable for use in an industrial application with an air source where an undesired or unsafe condition could be created if there is a fault in the primary valve. The redundant valve system 10 may, however, be used in any suitable environment with any suitable fluid source.

The first valve 12 and the second valve 14, which are arranged in a parallel configuration, function to selectively direct flow toward a first passage 24 or a second passage 26. The first valve 12 and the second valve 14 have two positions: the first position allows fluid flow toward the first passage 24 and the second position allows fluid flow toward the second passage 26. Further, the first position prevents fluid flow toward the second passage 26 and the second position prevents fluid flow toward the first passage 24. The first valve 12 and the second valve 14 may be further adapted such that while in the first position they provide an exhaust for the second passage 26, and while in the second position they provide an exhaust for the first passage 24. With this preferred configuration, fluid from the exhaust of the first valve 12 or the second valve 14 is released directly to the atmosphere or an exhaust container. The third valve 18 could also be further adapted such that while in the first position it provides an exhaust for the second valve 14, and while in the second position it provides an exhaust for the first valve 12. With this alternative configuration, fluid from the first valve 12 or the second valve 14 is passed through the third valve 18 and then to the atmosphere or an exhaust container. The first passage 24 and the second passage 26 may also include a shuttle valve 27 that functions to prevent fluid flow between the first valve 12 and the second valve 14. In an industrial application, the position of the first valve 12 and the second valve 14 could be controlled manually, or could alternatively be automated to cycle in a predetermined manner. In alternative embodiments, the first valve 12 and the second valve 14 may have more than two positions. The first valve 12 and second valve 14 are preferably conventional push or pull type valves, but may alternatively be any suitable flow control device. Further, the first valve 12 and the second valve 14 are preferably similar, if not exact, valve types, but may alternatively be different valve types.

Figure 3:
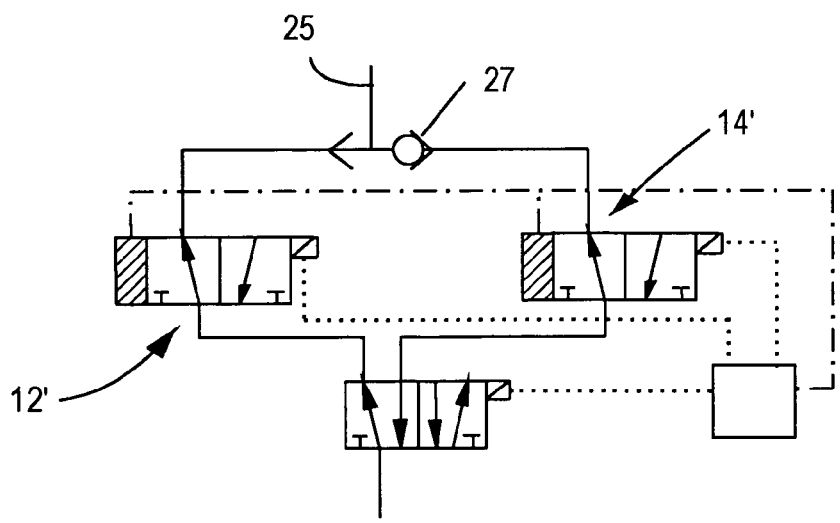
FIG. 3 is a schematic diagram of a second preferred embodiment of the invention.

In a second preferred embodiment, as shown in FIG. 3, the first valve 12' and the second valve 14', which are also arranged in a parallel configuration, function to selectively allow or prevent fluid flow toward a single passage 25. In all other respects, the redundant valve system 10' of the second preferred embodiment is similar to the redundant valve system 10 of the first preferred embodiment.

Figure 2:
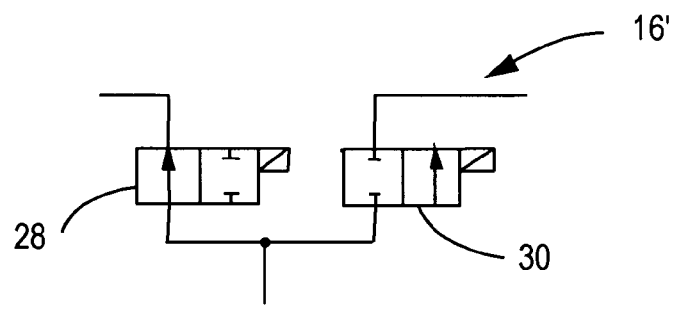
FIG. 2 is a schematic diagram of an alternative variation of the third valve unit.

As shown in FIG. 1, the third valve unit 16 functions to selectively direct fluid flow toward the first valve unit 12 or a second valve unit 14. The third valve unit 16 preferably includes a first position that allows fluid flow toward the first valve unit 12 and prevents fluid flow toward the second valve unit 14, and a second position that allows fluid flow toward the second valve unit 14 and prevents fluid flow toward the first valve unit 12. The third valve unit 16 may alternatively include more than two positions. In the preferred variation, the third valve unit 16 is a conventional rotating type valve. As shown in FIG. 2, the third valve unit 16' of an alternative variation includes two simple valves 28 and 30 in a parallel arrangement. In further alternative embodiments, the third valve unit could be any suitable flow control device or could include any suitable combination of flow control devices.

As shown in FIG. 1, the first diagnostic device 18 and the second diagnostic device 20 function to detect the presence of a fault in the first valve unit 12 and in the second valve unit 14, respectively, and—if a fault is detected—to send a fault signal. In the preferred embodiments, the diagnostic devices more specifically function to check the engagement of the valves into the first position and the engagement of the valves into the second position. In alternative embodiments, the diagnostic devices might only check the engagement of the valves into the first position or into the second position. In further alternative embodiments, the diagnostic devices may additionally check the response time for the engagement of the valves into the first position and/or into the second position.

The first diagnostic device 18 and the second diagnostic device 20 of a first variation of the preferred embodiment are connected to a fluid source (not shown) and they selectively direct this fluid through the first valve unit 12 and the second valve unit 14 during the diagnostic procedure. The diagnostic devices check for the passage of the fluid while the valves are in the first position and in the second position. If a fault is detected (i.e., fluid is passed through the valve when it is not expected to be passed, or the fluid does not pass through the valve when it is expected to be passed) the diagnostic device sends a fault signal. In alternative embodiments the first diagnostic device 18 and the second diagnostic device 20 are electronic switches. The diagnostic devices check for the actuation of the switch when the valves enter the first position and enter the second position. If a fault is detected (i.e., a position is not engaged when it is expected to engaged, or a position is engaged when it is not expected to engaged) the diagnostic device sends a fault signal. In further variations, the first diagnostic device 18 and the second diagnostic device 20 may include any other suitable method for fluid control detection, such as electromagnetic or sound wave propagation and detection.

In the preferred embodiments, the first diagnostic device 18 and the second diagnostic device 20 send a fault signal to the control unit 22 via a conventional analog wire. In alternative embodiments, the first diagnostic device 18 and the second diagnostic device 20 send a fault signal to the control unit 22 via other suitable mediums, such as analog radio frequency waves. Further, in alternative embodiments, the first diagnostic device 18 and the second diagnostic device 20 may send a fault signal to another suitable device that subsequently sends a fault signal to the control unit 22.

In the preferred embodiments, the first diagnostic device 18 and the second diagnostic device 20 are completely separate devices. In alternative embodiments, the first diagnostic device 18 and the second diagnostic device 20 may share particular components, such as a transmitter for the fault signal. In this alternative embodiment, any fault signal would preferably include the identification of the faulty valve unit.

The control unit 22, which is coupled to the third valve unit 16, functions to cycle the redundant valve system 10 between the first valve unit 12 and the second valve unit 14. The control unit 22 preferably includes a first operation mode that requests the first position for the third valve unit 16 and a second operation mode that requests the second position for the third valve unit 16. The control unit 22 may alternatively include additional operation modes. The control unit 22 is adapted to cycle between the first operation mode and a second operation mode after a predetermined interval, such as an elapsed time or a usage amount. In this manner, neither the first valve unit 12 nor the second valve unit 14 acts as a static standby valve. Because both valves act as the primary valve in an alternating fashion, the redundant valve system 10 of the preferred embodiments avoids the disadvantages of typical redundant valve systems.

The control unit 22 further functions to receive a fault signal from the first diagnostic device 18 and the second diagnostic device 20. If the third valve unit 16 is in the first position and the control unit 22 receives a fault signal from the second diagnostic device 20, then the control unit 22 does not cycle from the first operation mode to the second operation mode. Likewise, if the third valve unit 16 is in the second position and the control unit 22 receives a fault signal from the first diagnostic device 18, then the control unit 22 does not cycle from the second operation mode to the first operation mode. In this manner, the control unit 22 does not cycle the redundant valve system 10 to a valve suspected to be faulty. To receive the fault signal, the control unit 22 preferably includes an appropriate receiver, such as an analog radio frequency receiver. The control unit 22, however, may alternatively include any suitable device to receive fault signals.

Use of the redundant valve system 10 includes the following steps: (1) biasing the third valve unit into the first position and detecting the presence of a fault in the second valve unit; (2) maintaining the first position for the third valve unit during a predetermined interval; (3) upon the absence of a fault in the second valve unit, biasing the third valve unit into the second position and detecting the presence of a fault in the first valve unit; (4) maintaining the second position for the third valve unit during a predetermined interval; and (5) upon the absence of a fault in the first valve unit, repeating step (1). These steps are preferably continued, in this order, until the redundant valve system is no longer used. As a variation of this method, step (1) may further include detecting the presence of a fault in the first valve unit and, upon the presence of a fault in the first valve unit, biasing the third valve unit into the second position. Likewise, step (3) may further include detecting the presence of a fault in the second valve unit and, upon the presence of a fault in the second valve unit, biasing the third valve unit into the first position.

As a person skilled in the art of fluid control systems will recognize from the previous detailed description and from the figures and claims, modifications and changes can be made to the preferred embodiments of the invention without departing from the scope of this invention defined in the following claims.

We claim:

1. A redundant valve system, comprising:
   a first valve unit;
   a second valve unit arranged in a parallel configuration with the first valve unit wherein the first and second valve units have respective outlets for alternately directing fluid flow toward a first passage;
   a third valve unit having a first position that allows fluid flow toward the first valve unit and a second position that allows fluid flow toward the second valve unit;
   a first diagnostic device adapted to detect the presence of a fault in the first valve unit;
   a second diagnostic device adapted to detect the presence of a fault in the second valve unit; and
   a control unit coupled to the third valve unit and adapted to cycle between a first operation mode that biases the third valve unit into the first position and a second operation mode that biases the third valve unit into the second position.

2. The redundant valve system of claim 1 wherein the first valve and the second valve each have a first position that allows fluid flow toward the first passage, and each have a second position that allows fluid flow toward a second passage.

3. The redundant valve system of claim 2 wherein the first position of the first valve and the second valve also allows exhaust flow from the second passage, and wherein the second position of the first valve and the second valve also allows exhaust flow from the first passage.

4. The redundant valve system of claim 3 wherein the first position of the third valve also allows exhaust flow from the second valve, and wherein the second position of the third valve also allows exhaust flow from the first valve.

5. The redundant valve system of claim 3 further comprising a shuttle valve between the first valve and the second valve.

6. The redundant valve system of claim 1 wherein the second diagnostic device is further adapted to send a fault signal upon the detection of a fault in the second valve unit.

7. The redundant valve system of claim 6 wherein the control unit is further adapted to not cycle from the first operation mode to the second operation mode upon the receipt of a fault signal.

8. The redundant valve system of claim 1 wherein the control unit is further adapted to cycle between the first operation mode and the second operation mode after a predetermined interval.

9. The redundant valve system of claim 8 wherein the predetermined interval is an elapsed time.

10. A redundant valve system, comprising:
a first valve unit;
a second valve unit arranged in a parallel configuration with the first valve unit wherein the first and second valve units have respective outlets for alternately directing fluid flow toward a first passage;
a third valve unit having a first position that allows fluid flow toward the first valve unit and a second position that allows fluid flow toward the second valve unit;
a first diagnostic device adapted to detect the presence of a fault in the first valve unit; and
a second diagnostic device adapted to detect the presence of a fault in the second valve unit.

11. The redundant valve system of claim 10 wherein the second diagnostic device is further adapted to send a fault signal upon the detection of a fault in the second valve unit.

12. A redundant valve system, comprising:
a first valve unit;
a second valve unit;
a third valve unit having a first position that allows fluid flow toward the first valve unit and a second position that allows fluid flow toward the second valve unit; and
a control unit coupled to the third valve unit and adapted to cycle between a first operation mode that biases the third valve unit into the first position and a second operation mode that biases the third valve unit the second position, and wherein the control unit is further adapted to receive a fault signal and to not cycle from the first operation mode to the second operation mode upon the receipt of a fault signal.

13. The redundant valve system of claim 12 wherein the first valve unit and the second valve unit are arranged in a parallel configuration.

14. The redundant valve system of claim 12 wherein the control unit is further adapted to cycle between the first operation mode and the second operation mode after a predetermined interval.

15. The redundant valve system of claim 14 wherein the predetermined interval is an elapsed time.

16. The method for controlling a redundant valve system having a first valve unit, a second valve unit, a third valve unit having a first position that allows fluid flow toward the first valve unit and a second position that allows fluid flow toward the second valve unit, the method comprising the steps of:

(1) biasing the third valve unit into the first position and detecting the presence of a fault in the second valve unit;

(2) maintaining the first position for the third valve unit during a predetermined interval;

(3) upon the absence of a fault in the second valve unit, biasing the third valve unit into the second position and detecting the presence of a fault in the first valve unit;

(4) maintaining the second position for the third valve unit during a predetermined interval; and (5) upon the absence of a fault in the first valve unit, repeating step (1).

17. The method of claim 16 wherein step (1) further includes detecting the presence of a fault in the first valve unit and, upon the presence of a fault in the first valve unit, biasing the third valve unit into the second position.

18. The method of claim 17 wherein step (3) further includes detecting the presence of a fault in the second valve unit and, upon the presence of a fault in the second valve unit, biasing the third valve unit into the first position.

* * * * *